US012062517B2

(12) United States Patent
Nakano

(10) Patent No.: US 12,062,517 B2
(45) Date of Patent: Aug. 13, 2024

(54) SLOW-WAVE CIRCUIT, TRAVELING WAVE TUBE, AND METHOD FOR MANUFACTURING TRAVELING WAVE TUBE

(71) Applicant: NEC NETWORK AND SENSOR SYSTEMS, LTD., Tokyo (JP)

(72) Inventor: Takashi Nakano, Tokyo (JP)

(73) Assignee: NEC Network and Sensor Systems, Ltd., Tokyo (JP)

( * ) Notice: Subject to any disclaimer, the term of this patent is extended or adjusted under 35 U.S.C. 154(b) by 1010 days.

(21) Appl. No.: 16/969,647

(22) PCT Filed: Mar. 6, 2019

(86) PCT No.: PCT/JP2019/008864
§ 371 (c)(1),
(2) Date: Aug. 13, 2020

(87) PCT Pub. No.: WO2019/172312
PCT Pub. Date: Sep. 12, 2019

(65) Prior Publication Data

US 2020/0402758 A1 Dec. 24, 2020

(30) Foreign Application Priority Data

Mar. 7, 2018 (JP) ................................ 2018-041045

(51) Int. Cl.
*H01J 23/16* (2006.01)
*H01J 23/24* (2006.01)
*H01J 25/34* (2006.01)

(52) U.S. Cl.
CPC ............ *H01J 23/24* (2013.01); *H01J 23/165* (2013.01); *H01J 25/34* (2013.01)

(58) Field of Classification Search
CPC .......... H01J 23/07; H01J 23/165; H01J 23/24; H01J 23/34
See application file for complete search history.

(56) References Cited

U.S. PATENT DOCUMENTS 3,305,749 A 2/1967 Hogg
4,586,009 A 4/1986 James
(Continued)

FOREIGN PATENT DOCUMENTS

CN 101615553 A 12/2009
CN 102324363 A 1/2012
(Continued)

OTHER PUBLICATIONS

Khanh T. Nguyen et al., "Design Methodology and Experimental Verification of Serpentine/Folded-Waveguide TWTs", IEEE Transactions on Electron Devices, Jun. 2014, pp. 1679-1689, vol. 61, No. 6.

(Continued)

*Primary Examiner* — Jimmy T Vu
(74) *Attorney, Agent, or Firm* — Sughrue Mion, PLLC

(57) ABSTRACT

A slow-wave circuit comprises: a waveguide comprising a meander-shaped part that transmits an electromagnetic wave and alternately repeats a first folded part and a second folded part folded onto the opposite side to the first folded part; and a beam hole that transmits an electron beam, extends in a predetermined direction, and penetrates the meander-shaped part, wherein the beam hole penetrates the meander-shaped part so that a part of the beam hole protrudes from the first folded part.

9 Claims, 11 Drawing Sheets

(56) References Cited

U.S. PATENT DOCUMENTS

| | | | | |
|---|---|---|---|---|
| 4,807,355 | A | 2/1989 | Harper | |
| 5,422,596 | A * | 6/1995 | Armstrong | H01J 25/38 315/5 |
| 7,315,126 | B2 | 1/2008 | Theiss | |
| 9,041,289 | B2 | 5/2015 | Baik et al. | |
| 10,475,617 | B2 * | 11/2019 | Durand | H01J 25/025 |
| 10,483,075 | B2 | 11/2019 | Masuda et al. | |
| 10,490,382 | B2 | 11/2019 | Nakano | |
| 2006/0091830 | A1 | 5/2006 | Theiss | |
| 2006/0097669 | A1 | 5/2006 | Teshima et al. | |
| 2012/0081003 | A1 | 4/2012 | Baik et al. | |
| 2014/0265826 | A1 | 9/2014 | Goren et al. | |
| 2016/0293376 | A1 | 10/2016 | Nakano | |
| 2018/0337016 | A1 | 11/2018 | Masuda et al. | |
| 2019/0122848 | A1 | 4/2019 | Nakano | |

FOREIGN PATENT DOCUMENTS

| | | | |
|---|---|---|---|
| CN | 202111052 | U | 1/2012 |
| CN | 103354199 | A | 10/2013 |
| CN | 104576266 | A | 4/2015 |
| CN | 107424888 | A | 12/2017 |
| EP | 0 211 666 | A2 | 2/1987 |
| EP | 1 655 761 | A2 | 5/2006 |
| JP | 2006-134751 | A | 5/2006 |
| JP | 2016-189259 | A | 11/2016 |
| WO | 2017/104680 | A1 | 6/2017 |
| WO | 2017/154987 | A1 | 9/2017 |

OTHER PUBLICATIONS

Massood Tabib-Azar et al., "Microplasma Traveling Wave Terahertz Amplifier", IEEE Transactions on Electron Devices, Sep. 2017, pp. 3877-3884, vol. 64, No. 9.

International Search Report for PCT/JP2019/008864, dated Apr. 9, 2019.

Chinese Office Action for CN Application No. 201980015827.0 mailed on Nov. 14, 2022 with English Translation.

Japanese Office Action for JP Application No. 2020-505078 mailed on Mar. 30, 2021 with English Translation.

Carol Kory et al., "Microfabricated W-band traveling wave tubes", 2005 Joint 30th International Conference on Infrared and Millimeter Waves and 13th International Conference on Terahertz Electronics, IEEE, 2005, vol. 1, pp. 85-86.

* cited by examiner

FIG. 1A: X-X'
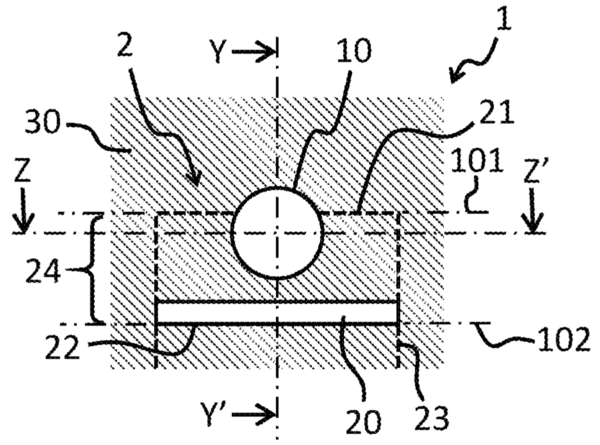
FIG. 1B: Y-Y'
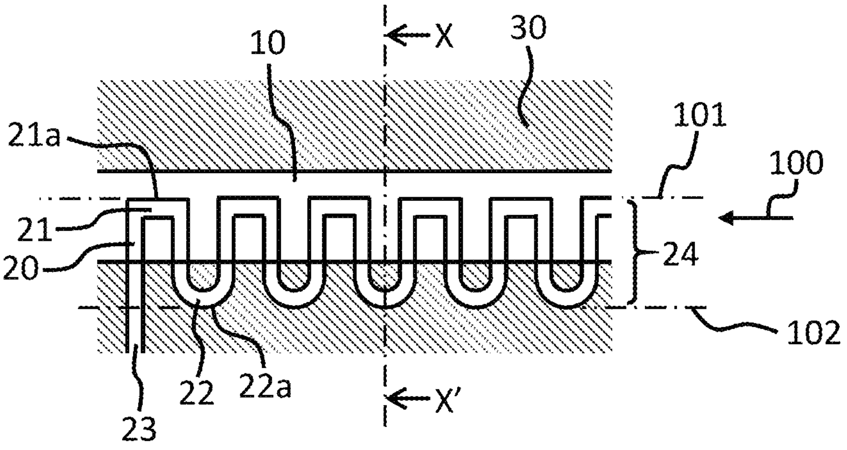
FIG. 1C: Z-Z'
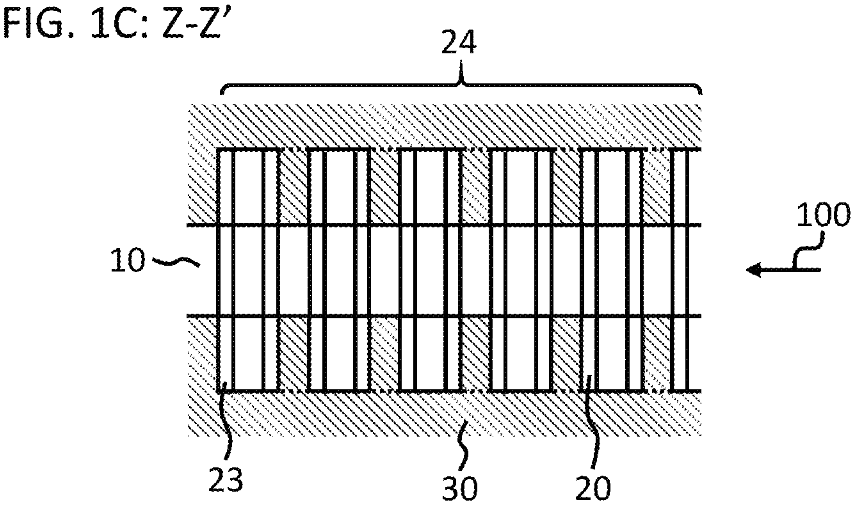

FIG. 2A: X-X'
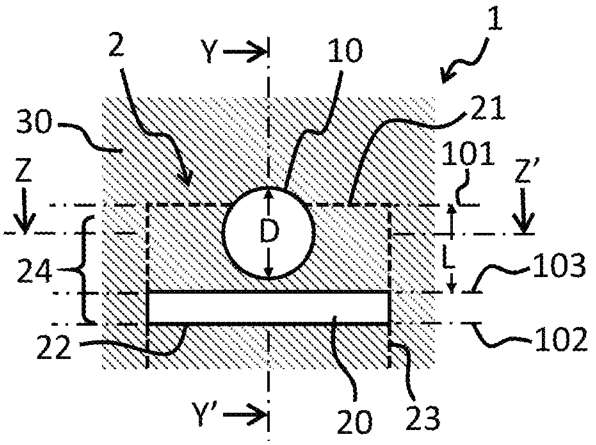
FIG. 2B: Y-Y'
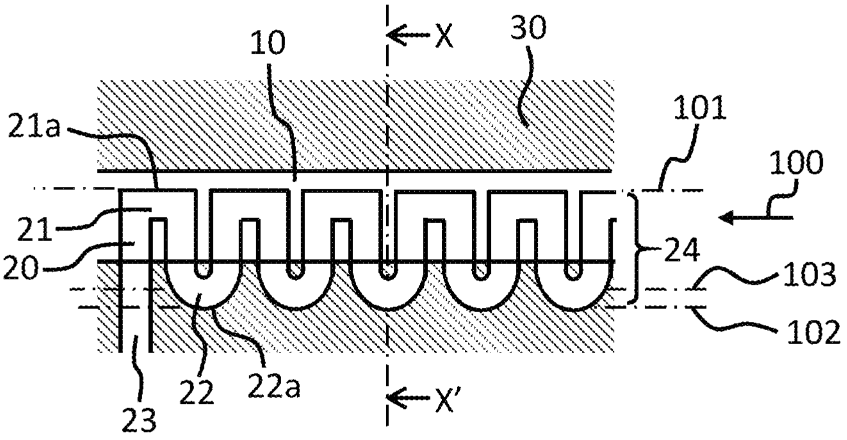
FIG. 2C: Z-Z'
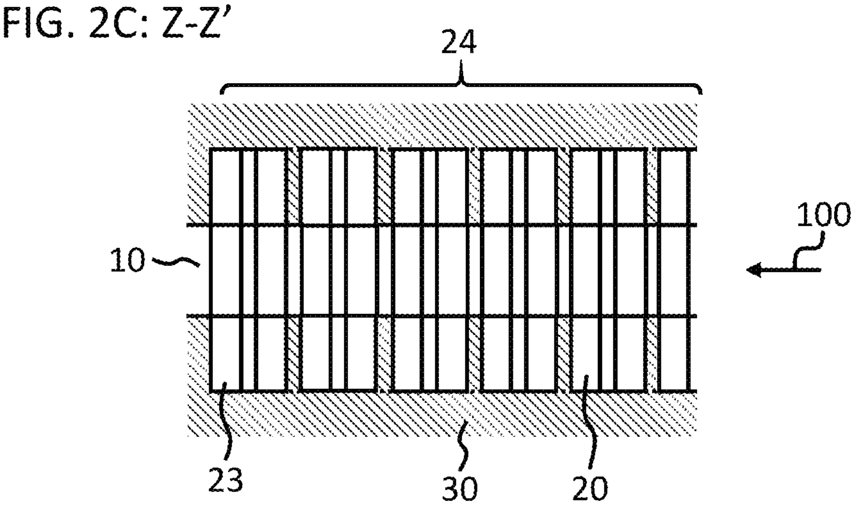

FIG. 3A: X-X'
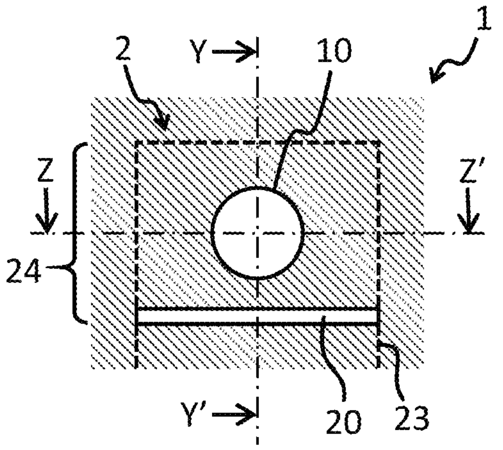
FIG. 3B: Y-Y'
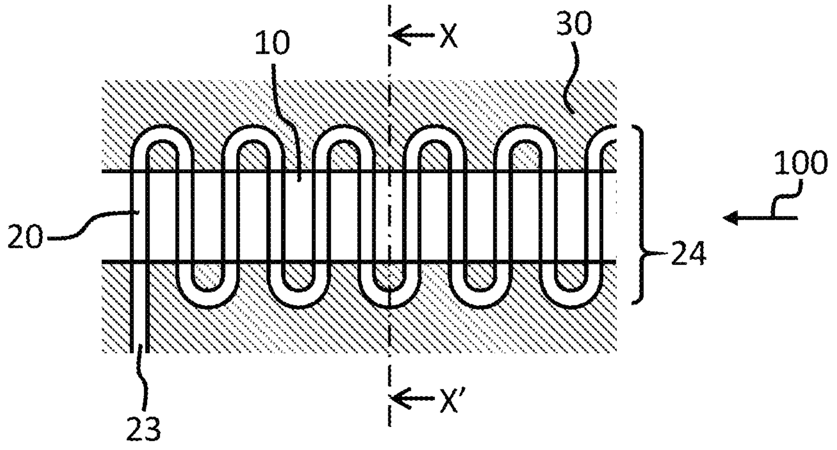
FIG. 3C: Z-Z'
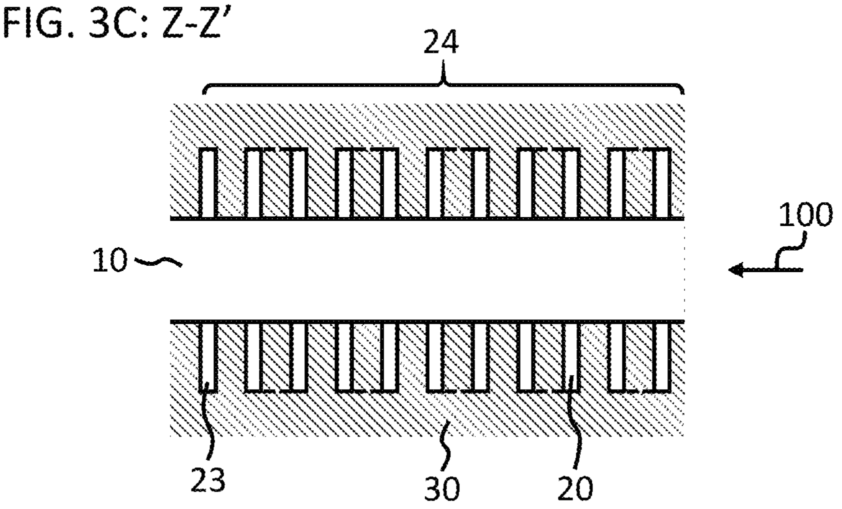

ELECTRIC FIELD DIAGRAM OF EXAMPLE 1

ELECTRIC FIELD DIAGRAM OF COMPARATIVE EXAMPLE

FIG. 11A: X-X'
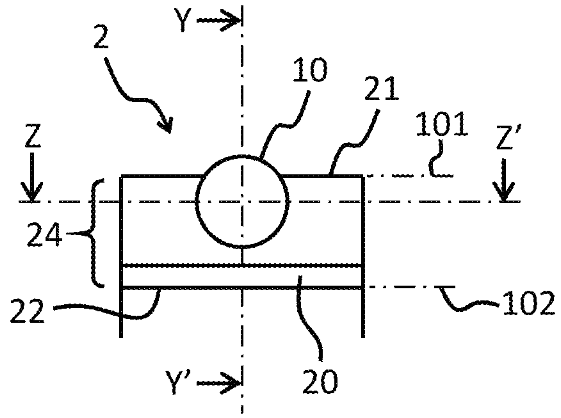
FIG. 11B: Y-Y'
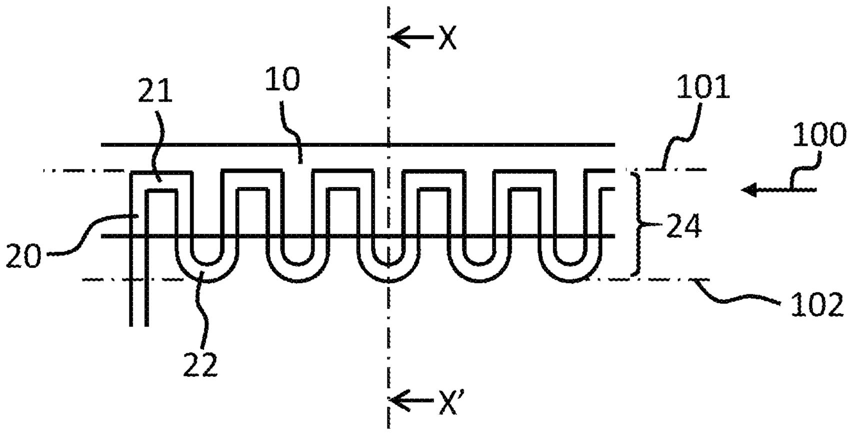
FIG. 11C: Z-Z'
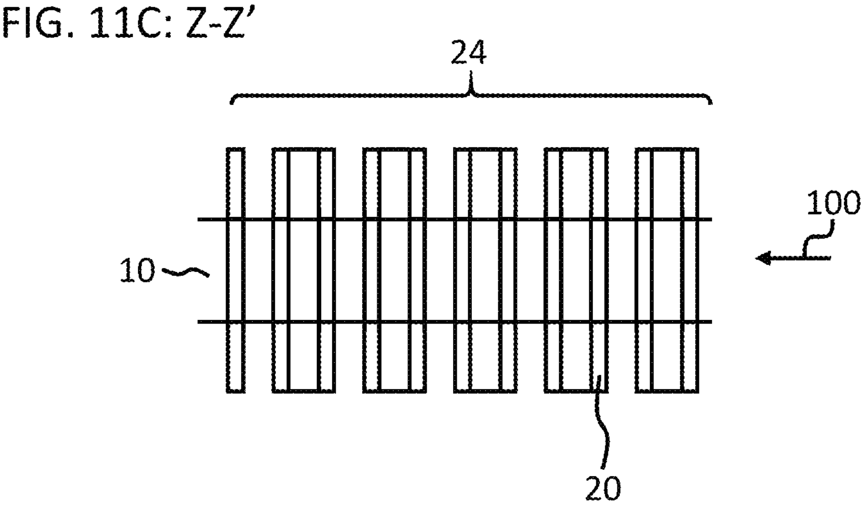

SLOW-WAVE CIRCUIT, TRAVELING WAVE TUBE, AND METHOD FOR MANUFACTURING TRAVELING WAVE TUBE

CROSS REFERENCE TO RELATED APPLICATIONS

This application is a National Stage of International Application No. PCT/JP2019/008864 filed Mar. 6, 2019, claiming priority based on Japanese Patent Application No. 2018-041045 filed Mar. 7, 2018, the entire contents of the application shall be incorporated and stated in the present application by reference.

FIELD

The present invention relates to a slow-wave circuit, a traveling wave tube, and a method for manufacturing a traveling wave tube.

BACKGROUND

In wireless systems such as satellite communication and radar, a traveling wave tube is mainly used as an amplifier for transmission source. The traveling wave tube amplifies an electromagnetic wave (for example, high frequency wave) for transmission by interacting with an electron beam used as an energy source. The traveling wave tube has a slow-wave circuit for causing the electromagnetic wave to provide a bypass from the electron beam in order to make the electromagnetic wave and the electron beam the same velocity upon causing interaction. As a method for causing an electromagnetic wave to bypass from a slow-wave circuit, there is a method called a helix type (for example, see Patent Literature (PTL) 1) in which an electromagnetic wave is caused to transmit through a helical waveguide and a beam hole through an electron beam is passed through the central axis of the helical waveguide.

By the way, at present, a shift toward high frequency of a radio frequency is underway, and a development of a radio device in a terahertz region is underway. Also, in the terahertz region, a development or the like of various sensing technologies is also underway in recent years. Accordingly, a development of an amplifier for transmission source in the terahertz region is required.

As the shift toward high frequency advances from microwaves to terahertz waves, the wavelength becomes smaller. Along with this, in the helix type slow-wave circuit, it becomes difficult to manufacture the helix type slow-wave circuit, since the spiral waveguide must be miniaturized. In the terahertz region, a folding type slow-wave circuit is regarded as promising to replace the helix type slow-wave circuit.

The folding type slow-wave circuit is configured to cause an electromagnetic wave to slow-wave by causing the electromagnetic wave to transmit through a meander-shaped (repeatedly fold-shaped, zigzag-shaped) waveguide and to penetrate a beam hole for transmitting an electron beam at a center of a direction in which folded parts of the meander-shaped waveguide are stacked (for example, see PTL 2 and Non-Patent Literature (NPTL) 1).

[PTL 1] JP2006-134751A
[PTL 2] JP2016-189259A
[NPTL 1] Design Methodology and Experimental Verification of Serpentine/Folded-Waveguide TWTs, Khanh T. Nguyen, IEEE Trans. on E.D., Vol. 61, No. 6, JUNE 2014.

SUMMARY

The following analyses are given by the present inventor.

In a folding type slow-wave circuit as described in PTL 2 and NPTL 1, an electromagnetic wave transmitted through a meander-shaped waveguide receives energy of an electron beam transmitted through a beam hole and is amplified. At this time, if the beam hole is large (approximately ¼ of the used wavelength λ), the electromagnetic waves are coupled to each other via the beam hole; evanescent energy (energy that does not fluctuate or travel in the electromagnetic field induced by the electromagnetic wave inside a reflective medium such as a metal) is generated; the energy loss increases; and the energy loss due to the reflection and scattering at the beam hole in the transmission direction of the waveguide also increases.

Also, in the configuration of the ordinary folding type slow-wave circuit, the frequency dispersion of the phase velocity increases due to the influence of the beam hole. Since the slow-wave circuit can amplify when the phase velocity is about the velocity of the electron beam, if the frequency dispersion of the phase velocity increases, the band in which the gain can be obtained also decreases.

Furthermore, even if the size of the slow-wave circuit is reduced along with shifting toward high frequency of the radio frequency, the problem due to the influence of the beam hole becomes more remarkable, since there is a limit to reducing the beam hole through which the electron beam passes.

It is a main object of the present invention to provide a slow-wave circuit, a traveling wave tube, and a method for manufacturing a traveling wave tube capable of contributing to widen a band range while reducing energy loss.

According to a first aspect, there is provided a slow-wave circuit, the slow-wave circuit comprising: a waveguide comprising a meander-shaped part that transmits an electromagnetic wave and alternately repeats a first folded part and a second folded part, the second folded part being folded onto an opposite side to the first folded part; and a beam hole that transmits an electron beam, extends in a predetermined direction, and penetrates the meander-shaped part, wherein the beam hole penetrates the meander-shaped part so that a part of the beam hole protrudes from the first folded parts.

According to a second aspect, there is provided a traveling wave tube, the traveling wave tube comprising a structure body (bodies) comprising the slow-wave circuit according to the first aspect.

According to a third aspect, there is provided a method for manufacturing a traveling wave tube, the method comprising: forming a first resist for forming a beam hole extending in a predetermined direction on a substrate (termed "step 1"); forming a second resist for forming a waveguide on the substrate including the first resist, the waveguide comprising a meander-shaped part, the meander-shaped part alternately repeats a first folded part and a second folded part, the second folded part being folded onto an opposite side to the first folded part, so that the first resist protrudes from a part corresponding to the first folded part in the second resist (termed "step 2"); forming a first structure body on the substrate including the first and second resists so that the first and second resists are completely buried (termed "step 3"); forming the first structure body comprising the beam hole and the waveguide by removing the substrate, the first resist and the second resist from the first structure body (termed "step 4"); forming a second structure body that is plane-symmetric with the first structure body by the same steps as the steps 1 to 4; and bonding the first and second structure bodies.

According to the first to fourth aspects, it is possible to contribute to widen a band range while reducing energy loss.

BRIEF DESCRIPTION OF THE DRAWINGS

FIGS. 1A-1C are diagram schematically showing a configuration of a traveling wave tube comprising a slow-wave circuit according to a first exemplary embodiment, wherein FIG. 1A is a cross-sectional view taken along a line X-X', FIG. 1B is a cross-sectional view taken along a line Y-Y', and FIG. 1C is a cross-sectional view taken along a line Z-Z'.

FIGS. 2A-2C are diagram schematically showing a configuration of a traveling wave tube comprising a slow-wave circuit according to a first exemplary embodiment, wherein FIG. 2A is a cross-sectional view taken along a line X-X', FIG. 2B is a cross-sectional view taken along a line Y-Y', and FIG. 2C is a cross-sectional view taken along a line Z-Z'.

FIGS. 3A-3C are diagram schematically showing a configuration of a traveling wave tube comprising a slow-wave circuit according to Comparative example, wherein FIG. 3A is a cross-sectional view taken along a line X-X', FIG. 3B is a cross-sectional view taken along a line Y-Y', and FIG. 3C is a cross-sectional view taken along a line Z-Z'.

FIGS. 11A-11C are diagrams schematically showing a configuration of a slow-wave circuit according to a fourth exemplary embodiment, wherein FIG. 11A is a cross-sectional view taken along a line X-X', FIG. 11B is a cross-sectional view taken along a line Y-Y', and FIG. 11C is a cross-sectional view taken along a line Z-Z'.

PREFERRED MODES

Figure 4:
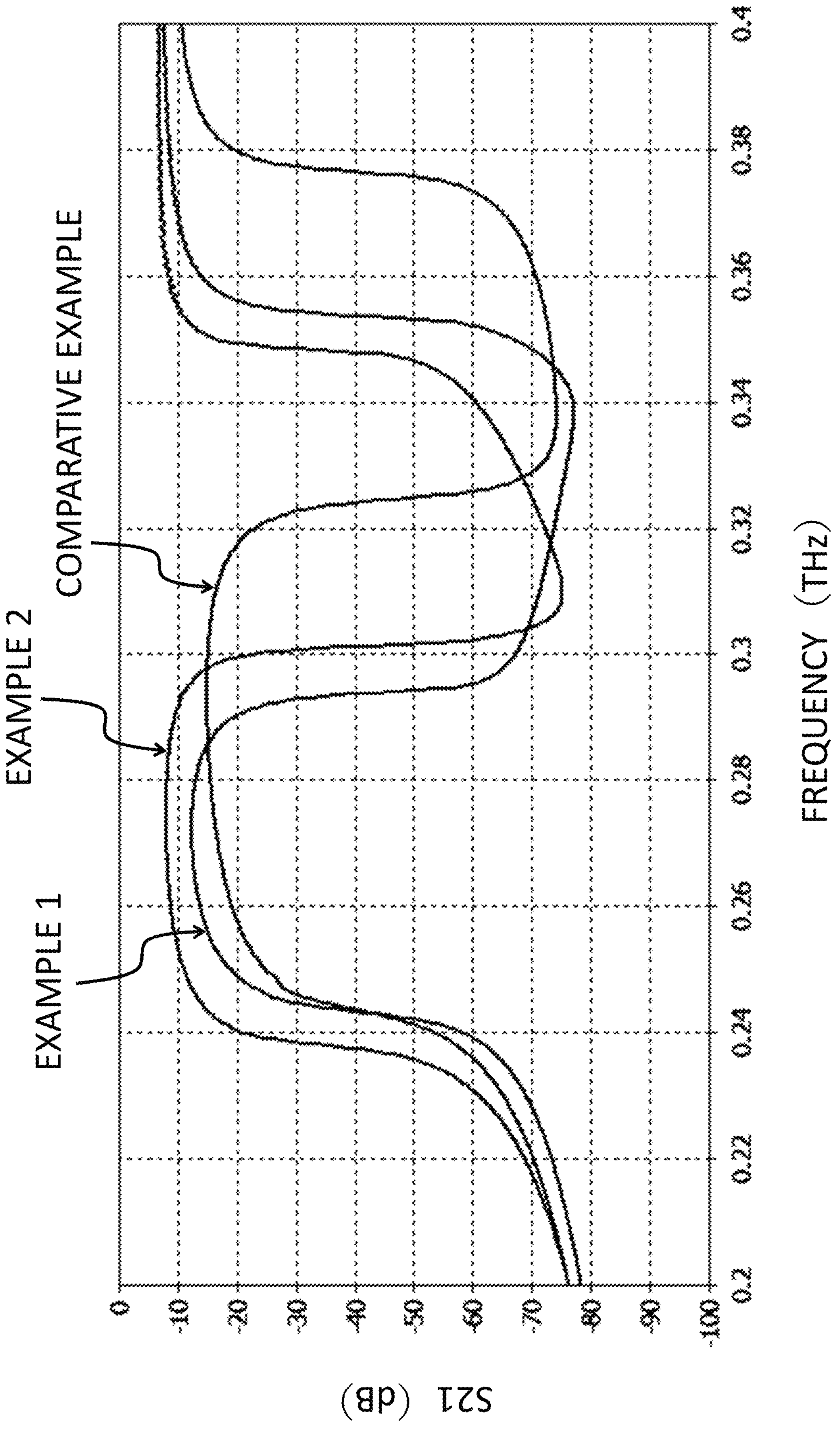
FIG. 4 is a graph showing a frequency dependence of S21 (transmission characteristics) of slow-wave circuits.

Hereinafter, exemplary embodiments will be explained with reference to the drawings. It should be noted that, in the present application, when reference signs are given in the drawings, they are only for the purpose of facilitating understanding, and are not intended to limit to the illustrated modes of the drawings. Also, the following exemplary embodiments are merely examples, and do not limit the present invention.

First Exemplary Embodiment

A traveling wave tube comprising a slow-wave circuit according to a first exemplary embodiment will be described with reference to the drawings. FIGS. 1A-1C are diagrams schematically showing a configuration of a traveling wave tube comprising a slow-wave circuit according to a first exemplary embodiment, wherein FIG. 1A is a cross-sectional view taken along a line X-X', FIG. 1B is a cross-sectional view taken along a line Y-Y', and FIG. 1C is a cross-sectional view taken along a line Z-Z'.

The traveling wave tube 1 is a device for causing an electromagnetic wave to interact with an electron beam to make each velocity of the electromagnetic wave and the electron beam approximately equal. The traveling wave tube 1 comprises a slow-wave circuit 2 and a structure body 30.

The slow-wave circuit 2 is a circuit for causing the electromagnetic wave to provide a bypass from the electron beam; causing the electromagnetic wave to interact with the electron beam; and making each velocity of the electromagnetic wave and the electron beam approximately equal. The slow-wave circuit 2 comprises a beam hole 10 and a waveguide 20.

The beam hole 10 is a space extending in a predetermined direction 100 and transmitting an electron beam. The cross section of the beam hole 10 can be substantially circular and may be polygonal. Here, the predetermined direction 100 is substantially parallel to a stacking (or repeating) direction of the waveguide 20 of a meander-shaped part 24.

The beam hole 10 intersects with a portion of the meander-shaped part 24 of the waveguide 20 at a right angle, the portion extending in a direction perpendicular to the predetermined direction 100.

The beam hole 10 penetrates the meander-shaped part 24. How to penetrate the beam hole 10 is as follows. The beam hole 10 penetrates the meander-shaped part 24 so that a part of the beam hole 10 protrudes from the first folded part 21 of the waveguide 20. The beam hole 10 penetrates the meander-shaped part 24 so that a part of the beam hole 10 continuously protrudes from the first folded part 21 of the waveguide 20 in the predetermined direction 100. The beam hole 10 penetrates the meander-shaped part 24 so that a part of the beam hole 10 protrudes (or exceeds) from a first reference plane 101 of the waveguide 20. The beam hole 10 penetrates the meander-shaped part 24 so that a part of the beam hole 10 protrudes (or exceeds) from the flat surface 21*a* of the waveguide 20.

A diameter of the cross section of the beam hole 10 can be about (above or below) ¼ of the use wavelength λ, for example, 0.2 times or more and 0.3 times or less of a use wavelength according to the electromagnetic wave, and preferably 0.22 times or more and 0.28 times or less thereof, more preferably 0.24 times or more and 0.26 times or less thereof.

The waveguide 20 is a space for transmitting electromagnetic waves. The waveguide 20 comprises a meander-shaped part 24 in which a first folded part 21 and a second folded part 22 are alternately repeated, the second folded part 22 being folded onto the opposite side to the first folded part 21. The waveguide 20 has a predetermined width and thickness except for the first folded part 21.

The first folded part 21 is folded along a first reference plane 101. The top of the first folded part 21 has a flat surface 21*a* along the first reference plane 101.

The second folded part 22 is folded along a second reference plane 102 spaced apart from the first reference plane 101. The top of the second folded part 22 has a curved surface 22*a*.

The meander-shaped part 24 is formed in a meandering shape (bellows-like repeatedly folded shape, zigzag shape) in which meandering, repeatedly folding, and zigzag are repeated. Here, the first reference plane 101 and the second reference plane 102 are substantially parallel to the predetermined direction 100. Both ends of the meander-shaped part 24 are connected to ports 23 serving as entrance and exit of electromagnetic waves.

The structure body 30 is an object (physical entity) on which the slow-wave circuit 2 is formed. For the structure body 30, for example, a metal or an alloy such as copper, silver, gold, nickel or the like can be used.

In the first exemplary embodiment, the traveling wave tube 1 is illustrated as an example, but the slow-wave circuit according to the first exemplary embodiment may be used for an amplifier such as a klystron.

According to the first exemplary embodiment, the beam hole 10 is formed so that a part of the beam hole 10 protrudes from the first folded part 21 in the meander-shaped part 24 of the waveguide 20, whereby the influence of the beam hole is reduced (matching is achieved), the energy loss is reduced, the frequency dispersion of the phase velocity is reduced, and it is possible to contribute to widen the band range. Also, according to the first exemplary embodiment, by forming the top of the first folded part 21 as the flat surface 21*a* along the first reference plane 101, the electric field of the electromagnetic wave relative to the beam in the predetermined direction 100 is increased, and the gain can be increased.

Second Exemplary Embodiment

A traveling wave tube comprising a slow-wave circuit according to a second exemplary embodiment will be described with reference to the drawings. FIGS. 2A-2C are diagram schematically showing a configuration of a traveling wave tube comprising a slow-wave circuit according to the second exemplary embodiment, wherein FIG. 2A is a cross-sectional view taken along a line X-X', FIG. 2B is a cross-sectional view taken along a line Y-Y', and FIG. 2C is a cross-sectional view taken along a line Z-Z'.

The second exemplary embodiment is a modification of the first exemplary embodiment, and in the second exemplary embodiment, a thickness of the waveguide 20 is larger than that of the first exemplary embodiment. The thickness of the waveguide 20 can be made optimal in a range thicker than that of the first exemplary embodiment in consideration of pressure resistance and the like, and can be about 1.2 to 1.8 times (about 1.5 times) of that of the first exemplary embodiment.

The diameter of the cross section of the beam hole 10 is 0.8 times or more and 1.2 times or less (about 1 time) of a distance between the first reference plane 101 and a third reference plane 103, preferably 0.9 times or more and 1.1 times or less thereof, more preferably 0.95 times or more and 1.05 times or less thereof. Here, the third reference plane 103 is a reference plane shifted from the second reference plane 102 to the side of the first reference plane 101 by the thickness of the waveguide.

According to the second exemplary embodiment, similarly to the first exemplary embodiment, the influence of the beam hole is reduced (matching is achieved); the energy loss is reduced; the frequency dispersion of the phase velocity is reduced; and it is possible to contribute to widen the band range. Also, by increasing the thickness of the waveguide 20, and setting the diameter of the cross section of the beam hole 10 to about one time the distance between the first reference plane 101 and the third reference plane 103, matching can be further improved than the first exemplary embodiment.

Example 1, Example 2, Comparative Example

Figure 5:
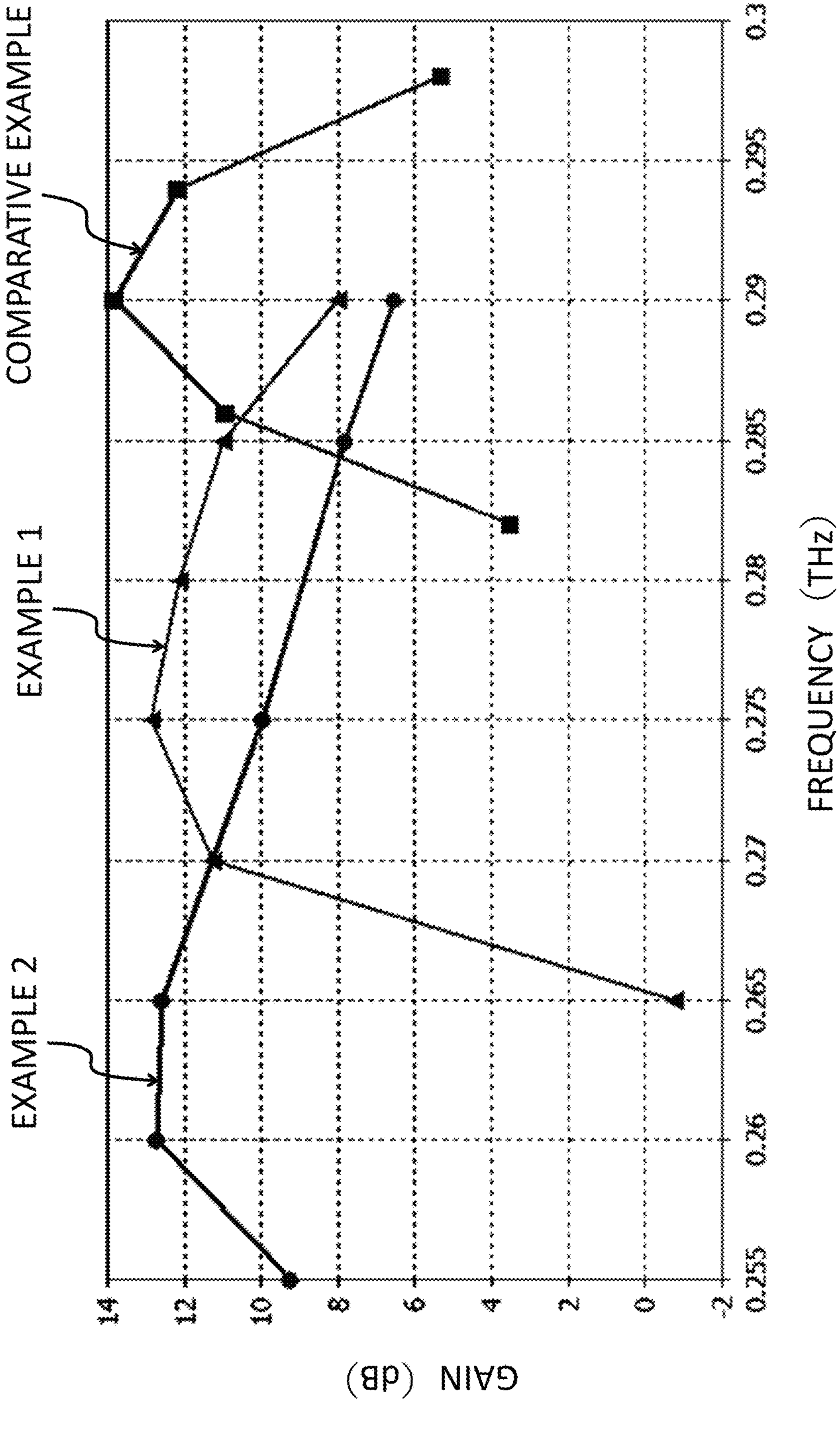
FIG. 5 is a graph showing calculation results of a gain band range when there is no energy loss.
Figure 6:
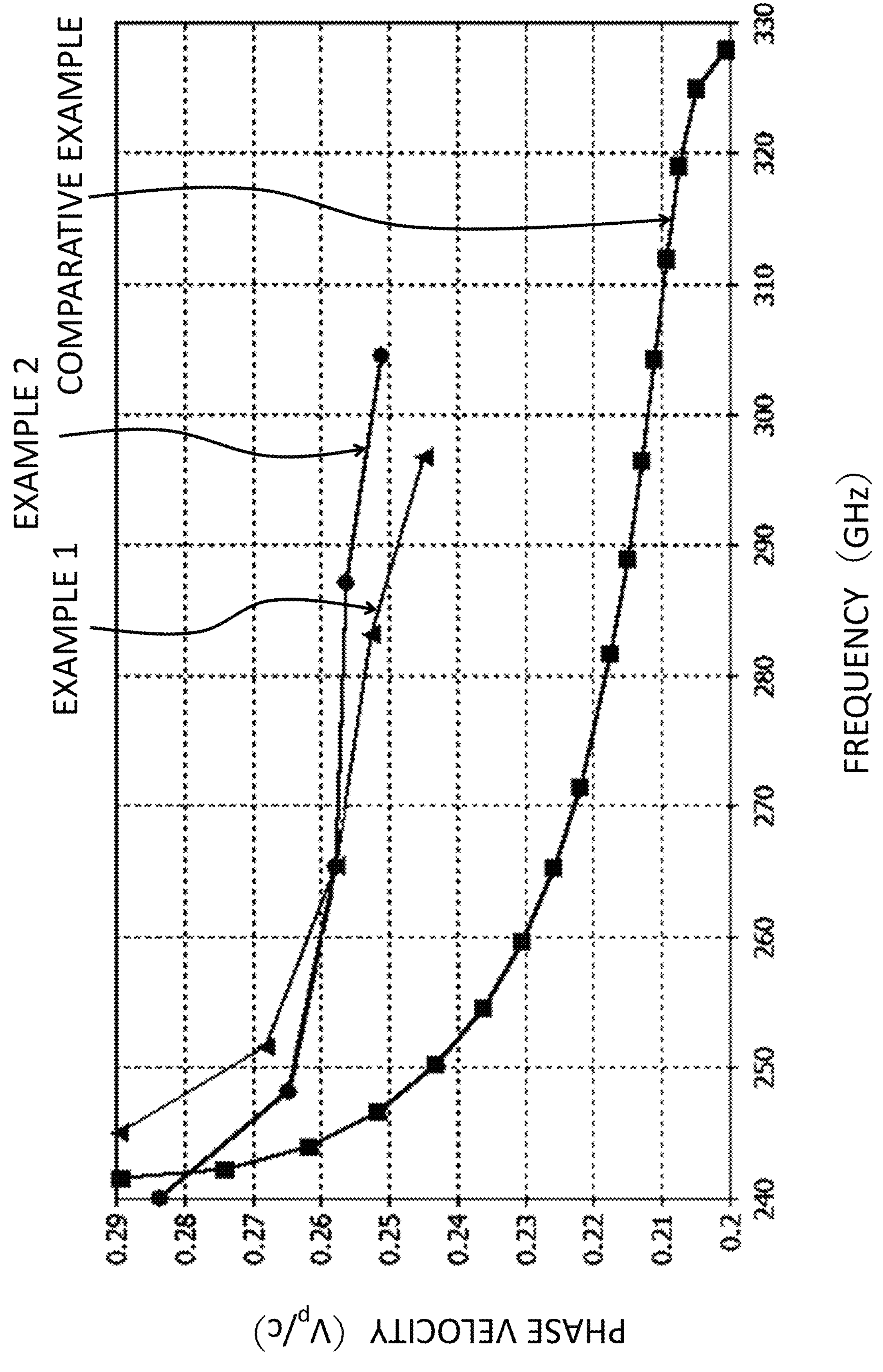
FIG. 6 is a graph showing a frequency dependence of a phase velocity of the slow-wave circuits.
Figure 7:
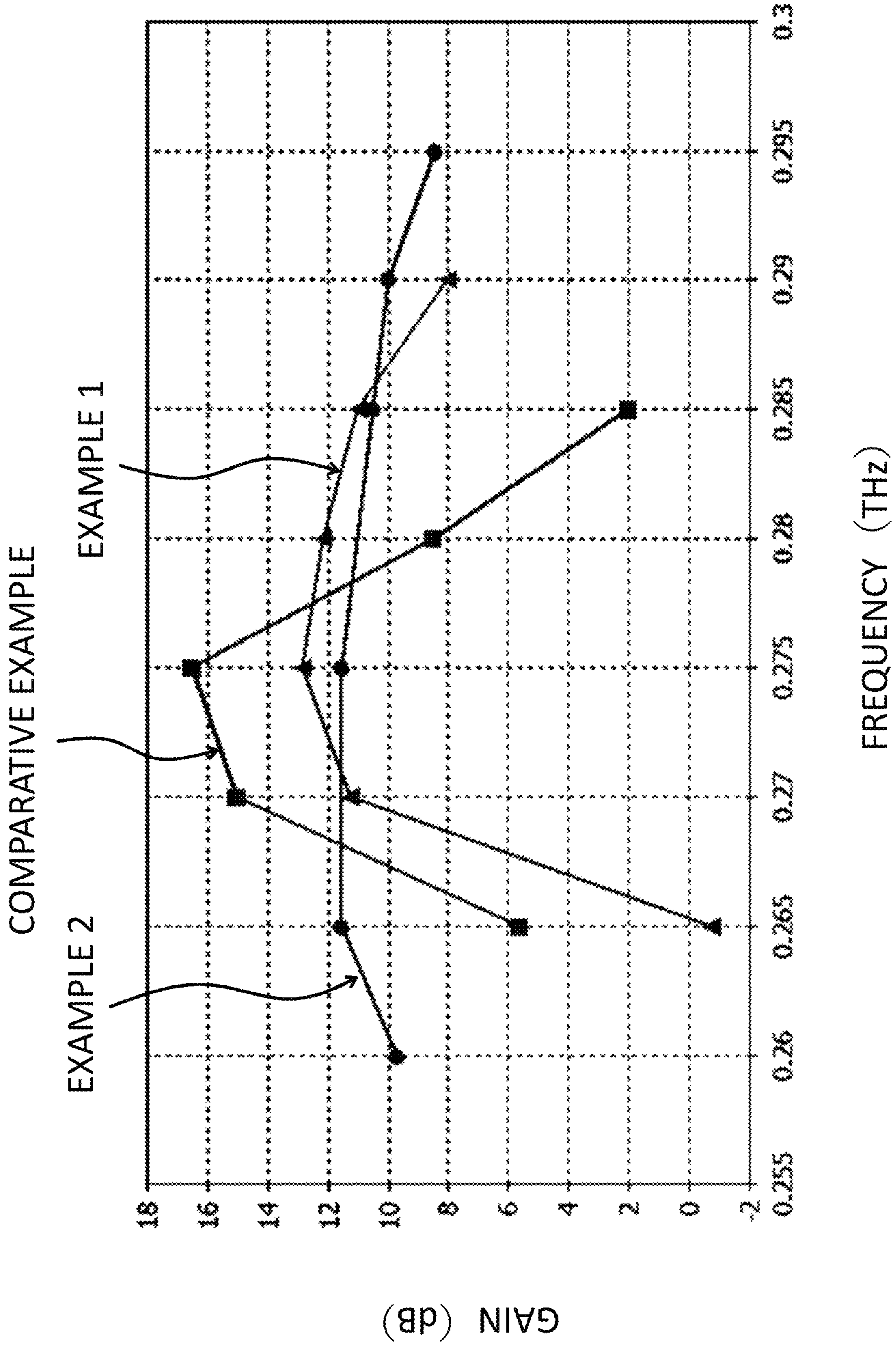
FIG. 7 is a graph showing calculation results of a gain band range in which an operating point is adjusted so that a peak comes at 275 GHz.
Figure 8A:
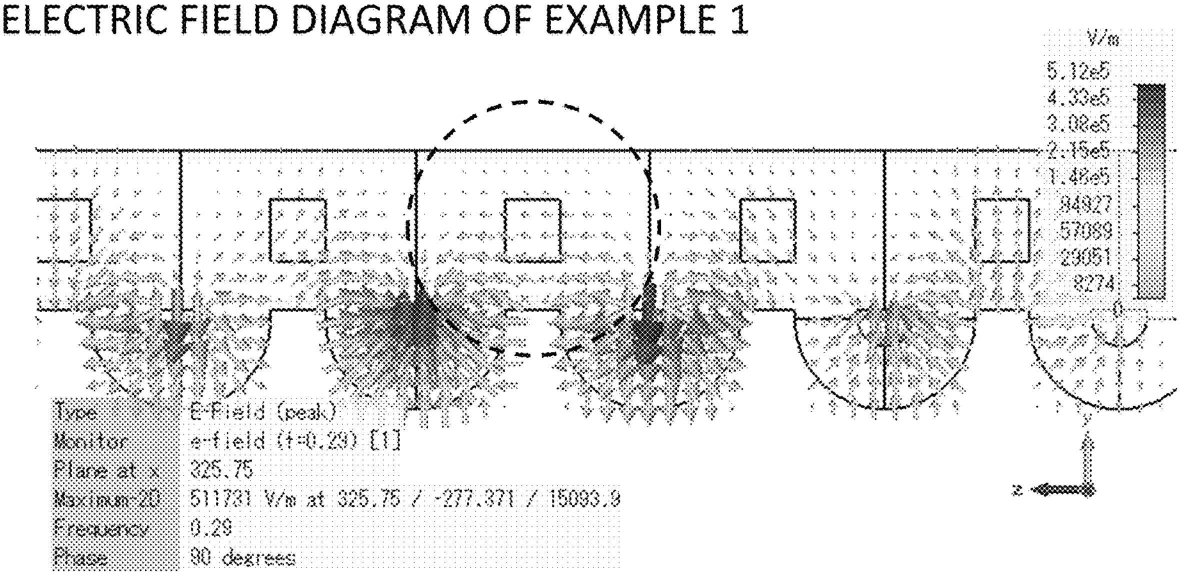
FIGS. 8A and 8B are diagram schematically showing the electric field distribution of slow-wave circuits, wherein FIG. 8A relates to Example 1, and FIG. 8B relates to Comparative example.
Figure 8B:
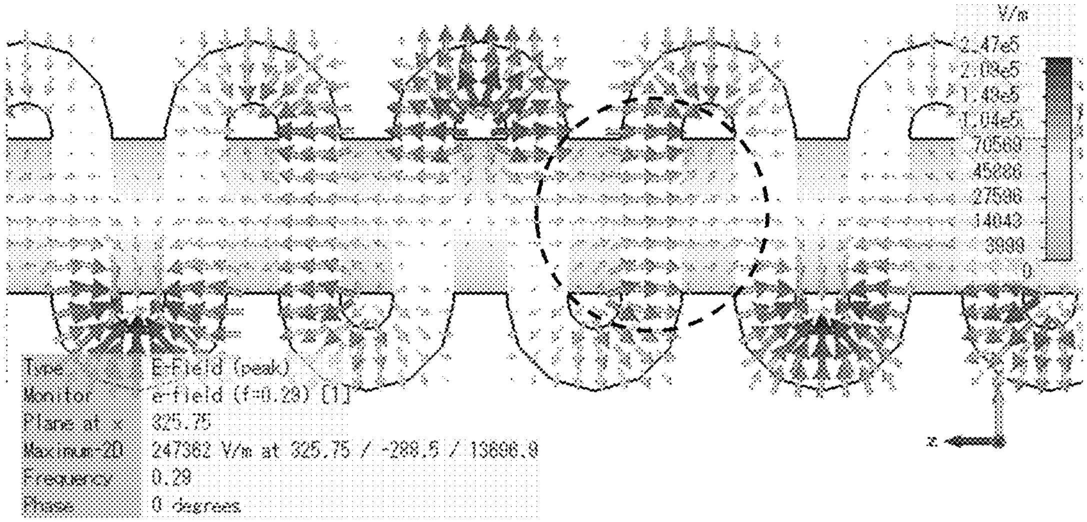

Characteristics of traveling wave tubes according to Examples 1 and 2 will be described with reference to the drawings while comparing a traveling wave tube according to Comparative example. FIGS. 3A-3C are diagram schematically showing a configuration of a traveling wave tube comprising a slow-wave circuit according to Comparative example, wherein FIG. 3A is a cross-sectional view taken along a line X-X', FIG. 3B is a cross-sectional view taken along a line Y-Y', and FIG. 3C is a cross-sectional view taken along a line Z-Z'. FIG. 5 is a graph showing calculation results of a gain band range when there is no energy loss. FIG. 6 is a graph showing a frequency dependence of a phase velocity of the slow-wave circuits. FIG. 7 is a graph showing calculation results of a gain band range in which an operating point is adjusted so that a peak comes at 275 GHz. FIGS. 8A and 8B are diagram schematically showing the electric field distribution of slow-wave circuits, wherein FIG. 8A relates to Example 1, and FIG. 8B relates to Comparative example.

First, a traveling wave tube according to Comparative example will be described. Referring to FIGS. 3A-3C, the traveling wave tube 1 comprises a waveguide 20 and a beam hole 10. The waveguide 20 comprises a meander-shaped part 24 that transmits electromagnetic waves and is repeatedly folded. A thickness of the waveguide 20 is the same as the first exemplary embodiment. The beam hole 10 transmits an electron beam; extends in a predetermined direction 100; and penetrates a center of the meander-shaped part 24. A cross-sectional shape of the beam hole 10 is circular, and its diameter is the same as the first and second exemplary embodiments.

A thickness of the traveling wave tube waveguide (20 in FIGS. 2A-2C) according to Example 2 is set to 1.5 times of a thickness of waveguide (20 in FIG. 1) of the traveling wave tube according to Example 1. Other configurations are the same as Examples 1, 2 and Comparative example.

FIG. 4 shows each frequency dependence of S21 (transmission characteristics) in Examples 1 and 2 and Comparative example. As compared with each optimum value near 0.27 THz, in Example 2, the energy loss is improved by about 7 dB (43%) to Comparative example. At that time, the gain (no loss) is about the same, and the band range can be expanded to double approximately. In Example 1, the energy loss is improved by about 3 dB relative to Comparative example. A conductivity of Cu according to a material of the structure body 30 is set to $2\times10^7$ S/m in consideration of a surface roughness.

FIG. 5 shows calculation results of gain band range in a case where there is no energy loss. A beam diameter is set to 0.6 times of a diameter of the beam hole 10. In Example 2, the gain is about the same as a gain of Comparative example and the band range is improved to about double relative to a band of Comparative example. In Example 1, the gain is about the same as that of Comparative example, and the band range is improved to about 1.6 times of that of Comparative example.

FIG. 6 shows each frequency dependence of phase velocities ($V_p$/c). In a configuration of Comparative example, the frequency dispersion of the phase velocity also increases due to an influence of the beam hole 10. Since a traveling wave tube can amplify when a phase velocity is about a velocity of the electron beam, the band range in which the gain can be obtained decreases if the dispersion increases. On the other hand, in Examples 1 and 2, frequency dispersions of phase velocities are smaller than that of a phase velocity of Comparative example.

In FIG. 6, as to the gain, it is operated so that about the same gains can be obtained by adjusting the operating points. At that time, since the gradient of the phase velocity in FIG. 6 is enlarged in Comparative example, the band range becomes narrow. However, the operating points are not so severely adjusted to increase the gain.

FIG. 7 shows a calculation result of a gain band range adjusted so that a peak comes at 275 GHz. In Comparative example, a gain increases but a band range decreases. In Example 2, the gain range decreases, but the band range increases, in comparison with Comparative example. When the peak frequencies are equalized, in Examples 1 and 2, gains slightly decrease, but band ranges greatly increase. In Comparative example, since the gradient of the phase velocity in FIG. 6 is large, a wide band range cannot be obtained.

FIGS. 8A and 8B show an electric field diagram. FIG. 8A shows Example 1 and FIG. 8B shows Comparative example. It is regarded as formulated that the gain increases as an electric field in the axial direction increases. The electric field at a center of a beam is almost the same in both Example 1 and Comparative example. As to a ratio of a region (a circle drawn with broken line in the figure, FIG. 8A corresponds to one cycle, and FIG. 8B corresponds to half cycle) in which the electric field is applied, Example 1 is one cycle whereas Comparative example is six cycles (3×2=6). Also, as to a central part of the beam, Example 1 is three cycles (an electric field may also be generated at a center), whereas Comparative example is two cycles. From this, it can be said that the gain of Example 1 is not so much lower than that of Comparative example even when the number of interactions is reduced to half.

The operating point can be adjusted by changing dimensions, and the band range can also be designed as desired.

Third Exemplary Embodiment

A method for manufacturing a traveling wave tube comprising a slow-wave circuit according to a third exemplary embodiment will be described with reference to the drawings. FIGS. 9A-9C, FIGS. 10A and 10B are process cross-sectional views schematically showing a method for manufacturing a traveling wave tube comprising a slow-wave circuit according to the third exemplary embodiment.

The third exemplary embodiment is a modification of the first exemplary embodiment, in which a traveling wave tube is divided into a plurality of pieces (two pieces in FIG. 10B) so that they can be bonded to each other. The beam hole 10 is vertically divided into a plurality of pieces at a center along an extending direction of the beam hole 10, and the waveguide 20 (including a port 23) is divided along the division surface of the beam hole 10. Accordingly, a structure body is also divided into a first structure body 30A and a second structure body 30B. The first structure body 30A and the second structure body 30B are joined by bonding. For joining the first structure body 30A and the second structure body 30B, a brazing material (for example, an alloy comprising a melting point of 800 to 1000° C.) can be used. A configuration of the completed traveling wave tube 1 is the same as the configuration of the first exemplary embodiment (see FIGS. 1A-1C). The method for bonding the divided parts as the third exemplary embodiment may be applied to the second exemplary embodiment.

Figure 9A:
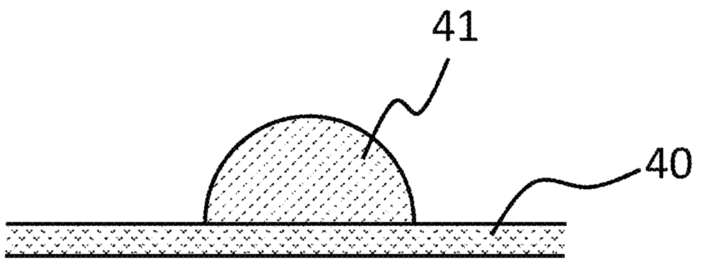
FIGS. 9A-9C are process cross-sectional views schematically showing a method for manufacturing a traveling wave tube comprising a slow-wave circuit according to a third exemplary embodiment.

First, a first resist 41 for forming a beam hole (10 in FIG. 10A) extending in a predetermined direction (corresponding to 100 in FIGS. 1A-1C) is formed on a substrate 40 (Step A1; see FIG. 9A). Here, the first resist 41 can be formed by using a lithography technique.

Figure 9B:
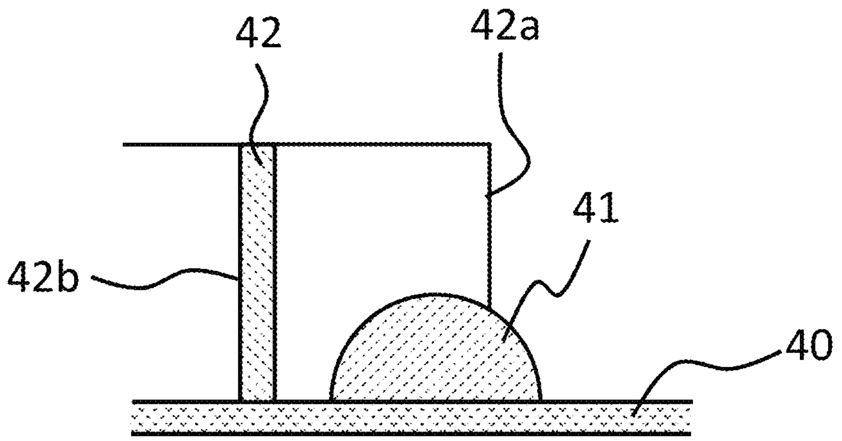

Next, a second resist 42 for forming a waveguide (20 in FIG. 10A) is formed on the substrate 40 including the first resist 41, the waveguide 20 comprising a meander-shaped part (24 in FIG. 10A) alternately repeating a first folded part (21 in FIG. 10A) and a second folded part (22 in FIG. 10A), and the second folded part 22 being folded onto the side opposite to the first folded part 21, so that the first resist 41 protrudes from a portion 42*a* corresponding to the first folded part 21 in the second resist 42 (and a portion 42*b* corresponding to the second folded part 22 does not overlap with the first resist 41) (Step A2; see FIG. 9B). Here, the second resist 42 can be formed by using a lithography technique.

Figure 9C:
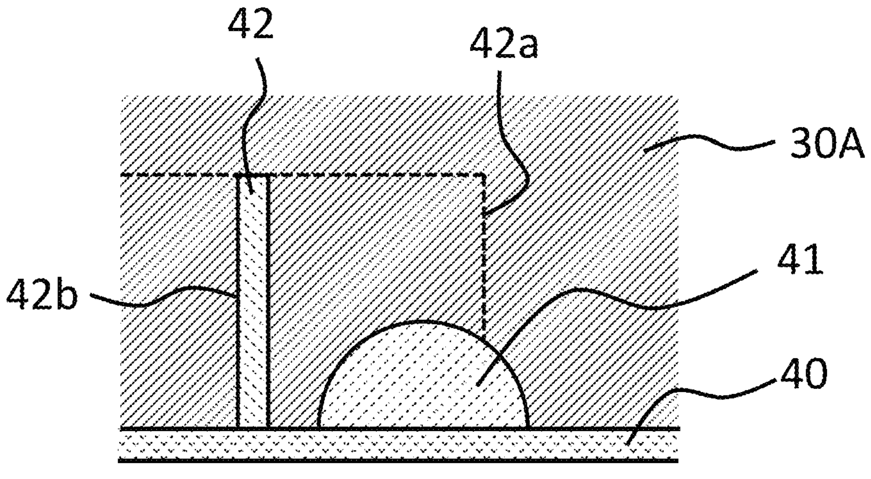

Next, the first structure body 30A is formed on the substrate 40 including the first resist 41 and the second resist 42 so that the first resist 41 and the second resist 42 are completely buried (Step A3; see FIG. 9C). Here, the first structure body 30A can be formed by using a plating technique.

Figure 10A:
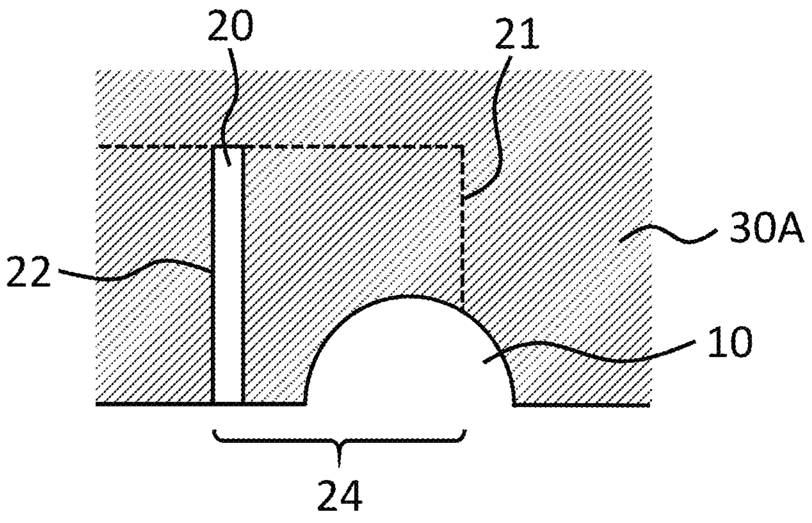
FIGS. 10A and 10B are process cross-sectional views schematically showing the method for manufacturing the traveling wave tube comprising the slow-wave circuit according to the third exemplary embodiment, which is subsequent to FIGS. 9A-9C (FIG. 9C).

Next, the substrate (40 in FIG. 9C) is removed (for example, peeled off) from the first structure body 30A, then the first resist (41 in FIG. 9C) and the second resist (42 of FIG. 9C) are removed (for example, removed by dissolving) (Step A4; see FIG. 10A). Thereby, the first structure body 30A comprising the beam hole 10 and the waveguide 20 is manufactured.

Separately from the manufacture of the first structure body 30A, a second structure (30B in FIG. 10B) that is plane-symmetric with the first structure body 30A is formed by steps similar to Steps A1 to A4 (Step A5; figure omitted).

Figure 10B:
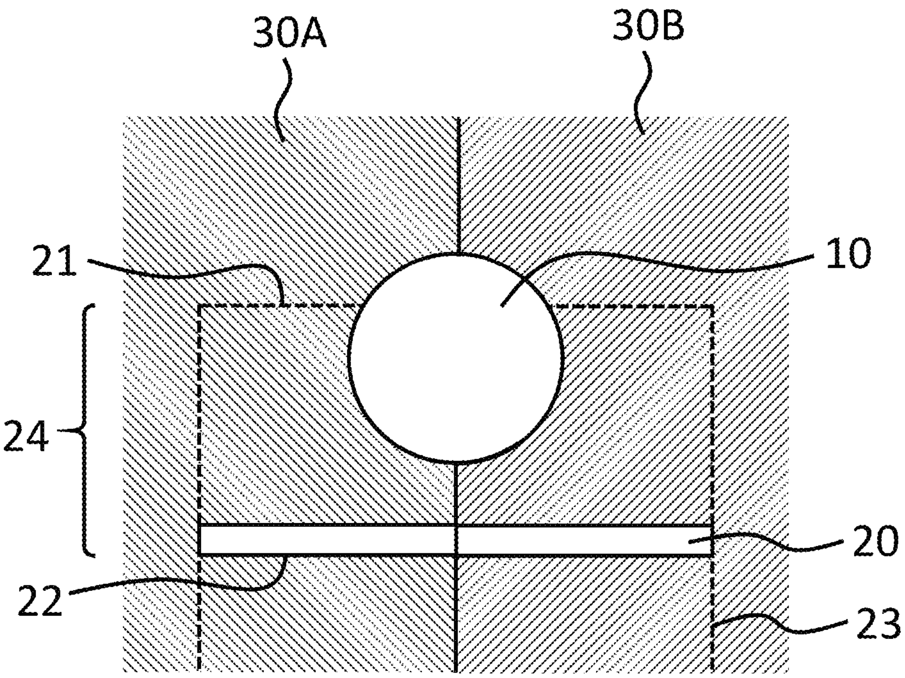

Finally, the first structure body 30A and the second structure body 30B are joined (bonded) together (Step A6; see FIG. 10B). Here, a brazing material can be used for joining the first structure body 30A and the second structure body 30B. Thus, the traveling wave tube is completed.

According to the third exemplary embodiment, configurations of the first and second exemplary embodiments can be easily manufactured, and the number of steps can be reduced and the cost can be reduced as compared with the case where the structure body is not divided into a plurality.

Fourth Exemplary Embodiment

A slow-wave circuit according to a fourth exemplary embodiment will be described with reference to the drawings. FIGS. 11A-11C are diagram schematically showing a configuration of a slow-wave circuit according to a fourth exemplary embodiment, wherein FIG. 11A is a cross-sectional view taken along a line X-X', FIG. 11B is a cross-sectional view taken along a line Y-Y', and FIG. 11C is a cross-sectional view taken along a line Z-Z'.

The slow-wave circuit 2 is a circuit for causing the electromagnetic wave to provide a bypass from the electron beam; causing the electromagnetic wave to interact with the electron beam; and making each velocity of the electromagnetic wave and the electron beam approximately equal. The slow-wave circuit 2 comprises a beam hole 10 and a waveguide 20.

The beam hole 10 transmits the electron beam, extends in a predetermined direction 100, and penetrates a meander-shaped part 24 of the waveguide 20. The beam hole 10 penetrates the meander-shaped part 24 so that a part of the beam hole 10 protrudes from the first folded part 21 of the waveguide 20.

The waveguide 20 comprises a meander-shaped part 24 that transmits an electromagnetic wave and alternately repeats a first folded part 21 and a second folded part 22, the second folded part 22 being folded onto the opposite side to the first folded part 21.

According to the fourth exemplary embodiment, the beam hole 10 is formed so that a part of the beam hole 10 protrudes from the first folded part 21 in the meander-shaped part 24 of the waveguide 20, whereby it is possible to contribute to broad widening of band range while reducing energy loss.

A part or all of the above-described exemplary embodiment can be described as the following appendix, but is not limited thereto.

APPENDIX

In the present invention, it is possible to adopt the mode of the slow-wave circuit according to the first aspect.

In the slow-wave circuit according to the first aspect, the beam hole penetrates the meander-shaped part so that the part of the beam hole continuously protrudes from the first folded parts in the predetermined direction.

In the slow-wave circuit according to the first aspect, the first folded parts are folded along a first reference plane; the second folded parts are folded along a second reference plane spaced apart from the first reference plane; and the beam hole penetrates the meander-shaped part so that the part of the beam hole protrudes from the first reference plane.

In the slow-wave circuit according to the first aspect, a top section of the first folded part has a flat surface along the first reference plane; and the beam hole penetrates the meander-shaped part such that a part of the beam hole protrudes from the flat surface.

In the slow-wave circuit according to the first aspect, a top section of the second folded part has a curved surface.

In the slow-wave circuit according to the first aspect, a cross section of the beam hole is circular; the predetermined direction is substantially parallel to the first and second reference planes; and a diameter of the cross section of the beam hole is 0.8 times or more and 1.2 times or less of a distance between the first reference plane and a third reference plane, the third reference plane shifting from the second reference plane toward the first reference plane by a thickness of the waveguide.

In the slow-wave circuit according to the first aspect, the diameter of the cross-section of the beam hole is 0.2 times or more and 0.3 times or less of a use wavelength for the electromagnetic wave.

In the slow-wave circuit according to the first aspect, the predetermined direction is substantially parallel to a stacking direction of the waveguide in the meander-shaped part.

In the present invention, it is possible to adopt the mode of the traveling wave tube according to the second aspect.

In the present invention, it is possible to adopt the mode of the method for manufacturing a traveling wave tube according to the third aspect.

The disclosures of the above Patent Literatures or the like are incorporated herein by reference. Within the ambit of the entire disclosure of the present invention (including the claims and the drawings), modifications and adjustments of the exemplary embodiments or examples are possible further based on the basic technical concept thereof. Also, various combinations or selections (non-selections if necessary) of various disclosed elements (including each element of each claim, each element of each exemplary embodiment or example, each element of each drawing, and the like) are possible within the ambit of the entire disclosure of the present invention. That is, the present invention naturally includes various variations and modifications that can be made by one skilled in the art according to the entire disclosure including the claims and the drawings and the technical concept. Further, as to the numerical values and the numerical ranges described in the present application, any intermediate value, lower numerical value, and small sub-range(s) are considered to be stated even if not explicitly mentioned.

REFERENCE SIGNS LIST

1 Traveling wave tube
2 Slow-wave circuit
10 Beam hole
20 Waveguide
21 First folded part
21*a* Flat surface
22 Second folded part
22*a* Curved surface
23 Port
24 Meander-shaped part
30 Structure body
30A First structure body
30B Second structure body
40 Substrate
41 First resist
42 Second resist
42*a* Part corresponding to the first folded part
42*b* Part corresponding to the second folded part
100 Predetermined direction
101 First reference plane
102 Second reference plane
103 Third reference plane

What is claimed is:

1. A slow-wave circuit, comprising:

a waveguide comprising a meander-shaped part that transmits an electromagnetic wave and alternately repeats a first folded part and a second folded part, the second folded part being folded onto an opposite side to the first folded part; and a beam hole that transmits an electron beam, extends in a predetermined direction, and penetrates the meander-shaped part, wherein the beam hole penetrates the meander-shaped part so that a part of the beam hole protrudes from the first folded parts, wherein the first folded parts are folded along a first reference plane;

the second folded parts are folded along a second reference plane spaced apart from the first reference plane; and the beam hole penetrates the meander-shaped part so that the part of the beam hole protrudes from the first reference plane.

2. The slow-wave circuit according to claim 1, wherein the beam hole penetrates the meander-shaped part so that the part of the beam hole continuously protrudes from the first folded parts in the predetermined direction.

3. The slow-wave circuit according to claim 1, wherein top section of the first folded part has a flat surface along the first reference plane; and the beam hole penetrates the meander-shaped part such that a part of the beam hole protrudes from the flat surface.

4. The slow-wave circuit according to claim 1, wherein a top section of the second folded part has a curved surface.

5. The slow-wave circuit according to claim 1, wherein
a cross section of the beam hole is circular;
the predetermined direction is substantially parallel to the first and second reference planes; and
a diameter of the cross section of the beam hole is 0.8 times or more and 1.2 times or less of a distance between the first reference plane and a third reference plane, the third reference plane shifting from the second reference plane toward the first reference plane by a thickness of the waveguide.

6. The slow-wave circuit according to claim 5, wherein the diameter of the cross-section of the beam hole is 0.2 times or more and 0.3 times or less of a use wavelength for the electromagnetic wave.

7. The slow-wave circuit according to claim 1, wherein the predetermined direction is substantially parallel to a stacking direction of the waveguide in the meander-shaped part.

8. A traveling wave tube, comprising a structure body (bodies) comprising the slow-wave circuit according to claim 1.

9. A method for manufacturing a traveling wave tube, comprising:
forming a first resist for forming a beam hole extending in a predetermined direction on a substrate (termed "step 1");
forming a second resist for forming a waveguide on the substrate including the first resist, the waveguide comprising a meander-shaped part, the meander-shaped part alternately repeats a first folded part and a second folded part, the second folded part being folded onto an opposite side to the first folded part, so that the first resist protrudes from a part corresponding to the first folded part in the second resist (termed "step 2");
forming a first structure body on the substrate including the first and second resists so that the first and second resists are completely buried (termed "step 3");
forming the first structure body comprising the beam hole and the waveguide by removing the substrate, the first resist and the second resist from the first structure body (termed "step 4");
forming a second structure body that is plane-symmetric with the first structure body by the same steps as the steps 1 to 4; and
bonding the first and second structure bodies.

* * * * *